(12) United States Patent
Kroth et al.

(10) Patent No.: US 11,816,364 B2
(45) Date of Patent: Nov. 14, 2023

(54) PERFORMANCE EVALUATION OF AN APPLICATION BASED ON DETECTING DEGRADATION CAUSED BY OTHER COMPUTING PROCESSES

(71) Applicant: Microsoft Technology Licensing, LLC, Redmond, WA (US)

(72) Inventors: Brian Paul Kroth, Madison, WI (US); Carlo Aldo Curino, Woodinville, WA (US); Andreas Christian Mueller, Los Gatos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 7 days.

(21) Appl. No.: 17/575,207

(22) Filed: Jan. 13, 2022

(65) Prior Publication Data
US 2023/0221896 A1 Jul. 13, 2023

(51) Int. Cl.
*G06F 3/06* (2006.01)
*G06F 12/0811* (2016.01)
(Continued)

(52) U.S. Cl.
CPC .......... *G06F 3/0664* (2013.01); *G06F 3/0604* (2013.01); *G06F 3/0616* (2013.01);
(Continued)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| 7,096,248 B2 * | 8/2006 | Masters | H04L 67/1001 |
| | | | 709/224 |
| 7,681,131 B1 * | 3/2010 | Quarterman | H04L 41/22 |
| | | | 709/224 |

(Continued)

FOREIGN PATENT DOCUMENTS

JP 2004264914 A * 9/2004 .......... G06F 11/3409

OTHER PUBLICATIONS

CPUID—CPU Identification; Feb. 12, 2019; retrieved from https://web.archive.org/web/20190212230051/https://www.felixcloutier.com/x86/cpuid on Mar. 14, 2023 (Year: 2019).*

(Continued)

*Primary Examiner* — Daniel C. Chappell
(74) *Attorney, Agent, or Firm* — Weaver IP L.L.C.

(57) ABSTRACT

Performance degradation of an application that is caused by another computing process that shares infrastructure with the application is detected. The application and the other computing device may execute via different virtual machines hosted on the same computing device. To detect the performance degradation that is attributable to the other computing process, certain storage segments of a data storage (e.g., a cache) shared by the virtual machines is written with data. A pattern of read operations are then performed on the segments to determine whether an increase in read access time has occurred. Such a performance degradation is attributable to another computing process. After detecting the degradation, a metric that quantifies the detected degradation attributable to the other computing process is provided to an ML model, which determines the actual performance of the application absent the degradation attributable to the other computing process.

20 Claims, 6 Drawing Sheets

(51) Int. Cl.
*G06F 12/0864* (2016.01)
*G06F 9/455* (2018.01)
*G06F 11/34* (2006.01)

(52) U.S. Cl.
CPC .......... *G06F 3/0659* (2013.01); *G06F 3/0673* (2013.01); *G06F 9/45558* (2013.01); *G06F 11/3409* (2013.01); *G06F 12/0811* (2013.01); *G06F 12/0864* (2013.01); *G06F 2009/45591* (2013.01)

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | | |
|---|---|---|---|---|
| 7,822,837 B1* | 10/2010 | Urban | ...................... | H04L 43/00 709/223 |
| 7,849,449 B2* | 12/2010 | Andrade | ................ | G06F 30/34 700/32 |
| 7,904,549 B2* | 3/2011 | Ohta | ................... | G06F 11/3476 709/200 |
| 8,099,488 B2* | 1/2012 | Laye | ................... | H04L 41/5025 709/224 |
| 9,336,117 B2* | 5/2016 | Agrawal | ........... | H04N 21/4431 |
| 9,671,124 B2* | 6/2017 | Sakaguchi | ........... | G06F 3/0673 |
| 10,065,118 B1* | 9/2018 | Kamath | ................ | G06F 3/0484 |
| 10,970,186 B2* | 4/2021 | Salunke | ................ | G06F 11/079 |
| 11,023,133 B2* | 6/2021 | Beloussov | ........... | G06F 3/0616 |
| 11,175,829 B2* | 11/2021 | Azmandian | ............. | G06F 3/067 |
| 11,405,051 B2* | 8/2022 | McBride | ............. | G06F 13/1673 |
| 11,474,718 B2* | 10/2022 | Song | ...................... | G06F 3/0631 |
| 2003/0120771 A1* | 6/2003 | Laye | ....................... | H04L 43/55 709/224 |
| 2011/0106949 A1* | 5/2011 | Patel | ................... | H04L 67/1008 718/1 |
| 2012/0023492 A1* | 1/2012 | Govindan | ................. | G06F 9/52 718/1 |
| 2012/0304175 A1* | 11/2012 | Damola | .............. | G06F 11/3419 718/1 |
| 2017/0249232 A1* | 8/2017 | Matsuki | .............. | G06F 11/3452 |

OTHER PUBLICATIONS

A. Andrzejak and L. Silva, "Using machine learning for non-intrusive modeling and prediction of software aging," NOMS 2008—2008 IEEE Network Operations and Management Symposium, Salvador, Brazil, 2008, pp. 25-32, doi: 10.1109/NOMS.2008.4575113. (Year: 2008).*

T. Hayashi and S. Ohta, "Performance Management of Virtual Machines via Passive Measurement and Machine Learning," 2012 9th International Conference on Ubiquitous Intelligence and Computing and 9th International Conference on Autonomic and Trusted Computing, Fukuoka, Japan, 2012, pp. 533-538 (Year: 2012).*

Valerii Petrov, Anna Gennadinik, and Elena Avksentieva. 2022. Metrics for machine learning evaluation methods in cloud monitoring systems. In Proceedings of the 2022 8th International Conference on Computer Technology Applications (ICCTA '22). ACM. pp. 168-175 (Year: 2022).*

Liu, et al., "Last-Level Cache Side-Channel Attacks are Practical", In Proceedings of IEEE Symposium on Security and Privacy, May 17, 2015, pp. 605-622.

"International Search Report and Written Opinion Issued in PCT Application No. PCT/US22/047960", dated Jan. 13, 2023, 11 Pages.

Roth, et al., "MLOS: Machine Learning Optimized Systems", Retrieved from: https://github.com/microsoft/MLOS, Dec. 2, 2020, 9 Pages.

* cited by examiner

PERFORMANCE EVALUATION OF AN APPLICATION BASED ON DETECTING DEGRADATION CAUSED BY OTHER COMPUTING PROCESSES

BACKGROUND

To perform auto-tuning of configurations for an application, one needs to be able to conduct evaluations of application performance with reliable and repeatable output metrics. Despite years of systems research and engineering efforts on isolation mechanisms, performance in cloud environments is still quite variable, so even a single untuned and unchanged configuration may result in different performance metrics for different times or locations (e.g., virtual machine (VM) placement or colocation) based on various aspects of this "cloud weather", sometimes also referred to as "noisy neighbors".

In bare metal hardware systems users can be very careful to isolate their application experiments from other workloads. Additionally, privileged users can gain access to hardware performance counters that inform them how certain low-level resources on the system are being used (e.g., central processing unit (CPU) cache accesses, instruction counts, branch misses, etc.). However, cloud systems use VMs on top of a shared infrastructure, so neither privileged access nor hardware performance counters are available (for cost and security reasons), thereby making performance evaluation on the cloud far less reproducible and far more challenging.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to detect the performance degradation of an application that is caused by another computing process that shares infrastructure with the application. The application may be executing on a first virtual machine hosted on a computing device, and the other computing process may be executing on a second virtual machine hosted on the same computing device. To detect the performance degradation that is attributable to the other computing process, certain storage segments of a data storage (e.g., a cache) shared by the virtual machines may be written to with data. A pattern of read operations are then performed on the storage segments to determine whether an increase in read access time has occurred. Such a performance degradation may be caused by another computing process. After detecting the performance degradation, a performance metric that quantifies the detected performance degradation that is attributable to the other computing process may be provided to a machine learning model, which determines the actual performance of the application absent the degradation attributable to the other computing process.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
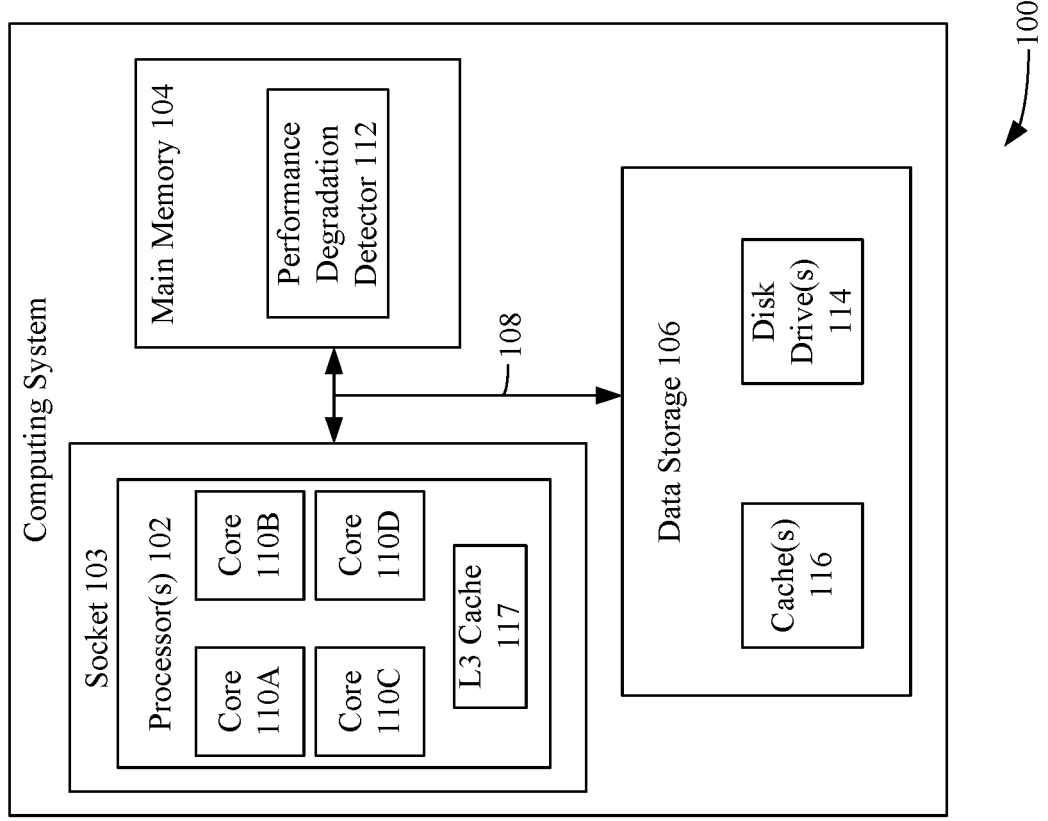
FIG. 1 shows a block diagram of an example computing system configured to detect a degradation in performance of an application that is caused by another computing device in accordance with an embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, terms such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting.

Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

The embodiments described herein are directed to detecting the performance degradation of an application that is caused by another computing process that shares infrastructure (e.g., one or more storage devices, memories, and/or caches) with the application. The application may be executing on a first virtual machine hosted on a computing device, and the other computing process may be executing on a second virtual machine hosted on the same computing device. To detect the performance degradation that is attributable to the other computing process, certain storage segments of a data storage (e.g., a cache) shared by the virtual machines may be written to with data. A pattern of read operations are then performed on the storage segments to determine whether an increase in read access time has occurred. Such a performance degradation may be caused by another computing process. For instance, in an embodiment in which the data storage is a cache, the data written to cache lines thereof should remain in the cache unless another computing process causes such data to be evicted from the cache. In such a case, the data must be retrieved from a higher level of memory, such as the main memory of the computing device. Retrieving data from the main memory takes a longer amount of time than retrieving data from the cache. Accordingly, the application suffers as it must wait a longer amount of time to receive the data and subsequently perform operations thereon. After detecting the performance degradation, a performance metric that quantifies the detected performance degradation (i.e., noise) that is attributable to the other computing process may be provided to a machine learning model, which determines the actual performance of the application absent the degradation attributable to the other computing process.

The embodiments described herein advantageously improve the functioning of a computing device on which the application executes. For instance, by accurately determining the performance of the application, the application may be automatically tuned correctly to improve the performance of the application. For instance, certain configurations, parameters, and/or settings may be changed for the application (and/or associated components, such as the operating system, VM configuration, etc.). Such tuning may cause the application to execute more efficiently, thereby conserving resources (e.g., processing cycles, memory, storage, input/output (I/O) transactions, power, etc.) of the computing device on which the application executes. Attempting to blindly tune the application without factoring any degradation caused by other computing processes may result in application being configured less optimally.

Such techniques advantageously enable the performance degradation that is attributable of other computing processes to be inferred without the usage of hardware counters or privileged access to the underlying VM serving platform.

FIG. 1 depicts a computer system 100 configured to detect a degradation in performance of an application that is caused by another computing device in accordance with an example embodiment. As shown in FIG. 1, computer system 100 includes one or more processor(s) 102 (also called central processing units, or CPUs), a primary or main memory 104, and data storage 106. Processor(s) 102, main memory 104, and data storage 106 are connected to a communication interface 108 via a suitable interface, such as one or more communication buses. In some embodiments, processor(s) 102 can simultaneously operate multiple computing threads, and in some embodiments, processor(s) 102 may each comprise one or more processor core(s) 110A-110D. Each of processor(s) 102 may be fixedly attached to a motherboard via respective central processing unit (CPU) socket 103 thereof. It is noted that while processor(s) 102 are shown as including four cores 110A-110D, processor(s) 102 may comprise any number of cores. As further shown in FIG. 1, each of processor(s) 102 comprises a level three (L3) cache 117. L3 cache 117 is included on the same socket (i.e., socket 103) as cores 110A-110D and shared by each of cores 110A-110D. L3 cache 117 is a transparent cache configured (e.g., by the manufacturer thereof) to operate either in a writethrough mode (where data is written to both L3 cache 117 and the backing store, such as main memory 104) or a writethrough mode (where data is flushed to main memory 104 asynchronously) and an inclusive mode (where all the cache lines stored in a lower level cache are stored in L3 cache 117 (e.g., all the cache lines in an L1 cache are stored in an L2 cache, and all the cache lines stored in the L2 cache are stored in L3 cache 117). Accordingly, L3 cache 117 is generally not directly accessible by an application (e.g., performance degradation detector 112, as will be described below). Examples of main memory 104 include a random access memory (RAM) (e.g., dynamic RAM (DRAM), synchronous DRAM (SDRAM), dual-data rate RAM (DDR-RAM), etc.). Data storage 106 may comprise various physical data storage, including, but not limited to one or more disk drives 114 and one or more caches 116. Examples of disk drives include, but are not limited to, one or more hard disk drives, one or more solid state drives, one or more memory cards, one or more memory sticks, a floppy disk, magnetic tape, compact disk, DVD, optical storage disk, or any other computer data storage device. Each of disk drive(s) 114 may comprise a plurality of storage sectors that each store a fixed amount of data (e.g., 512 bytes). Each of the storage sectors of disk drive(s) 114 represents the minimum storage unit thereof. Examples of cache(s) 116 include but are not limited to caches that are located externally to processor(s) 102 (e.g., on a motherboard on which processor(s) 102 are located) and accessible and shared by a plurality of processor core 110A-110D and/or a plurality of processor(s) 102. Each of cache(s) 116 and L3 cache 117 may comprise a plurality of storage segments, such as cache lines. Each cache line represents the unit of data transfer between the cache in which it resides and main memory 104. Each cache line may generally be fixed in size, typically ranging from 16 to 256 bytes. Each of cache(s) 116 and L3 cache 117 may have a respective configuration, including a respective size (e.g., 10 megabytes (MB) to 64 MB, a number of ways of associativity (e.g., a 2-way, 4-way, or 8-way set associativity, etc.), and a number of lines per set.

Computing system 100 may be any type of processing device, including, but not limited to, a desktop computer, a server, a mobile device (e.g., a tablet, a personal data assistant (PDA), a smart phone, a laptop, etc.), an IoT device, etc. In an embodiment in which computer system 100 is a server, the server (also referred to as a node) may be incorporated as part of a cloud-based platform. In accordance with at least one embodiment, the cloud-based platform comprises part of the Microsoft® Azure® cloud computing platform, owned by Microsoft Corporation of Redmond, Wash., although this is only an example and not intended to be limiting.

Each of processing cores 110A-110D may comprise a level 1 (L1) cache (not shown in FIG. 1) for storing instructions and/or data. Each of processing cores 110A-110D may be configured to retrieve instructions and/or data from the L1 cache. In the event that requested instructions and/or data are not located in the L1 cache, the requested blocks and/or data may be retrieved from a higher-level memory. For example, processing cores 110A-110D may each be configured to retrieve instructions and/or data from a level two (L2) cache (not shown) included in processor(s) 102 that is shared by each of processing cores 108A-108D. In the event that the requested instructions and/or data are not included in the L2 cache, processing core(s) 108A-108D may be configured to retrieve instructions and/or data from an L3 cache, which is included on a motherboard to which processor 102 is attached. In the event that the requested instructions and/or data are not included in the L3 cache, processing core(s) 108A-108D may be configured to retrieve instructions and/or data from main memory 104, which is included on a motherboard to which processor 102 is attached.

Computing system 100 may be utilized to host a plurality of virtual machines. Each of the virtual machines are virtualized instances of a computer that generally perform all of the same functions a computer, including running applications and operating systems. Virtual machines access computing resources from a software application called a hypervisor. The hypervisor abstracts the resources of the physical machine (e.g., computing system 100) into a pool that can be provisioned and distributed as needed, enabling multiple virtual machines to run on a single physical machine. In an embodiment in which computing system 100 is a server or node in a cloud-based platform, a customer of the cloud-based platform may provision one or more virtual machines on computing system 100 via a paid subscription. Computing system 100 may support multi-tenancy, where cloud-based platform software services multiple tenants (e.g., different customers), with each tenant including one or more users (or customers) who share common access to certain software services, applications, and/or servers of the cloud-based platform.

As also shown in FIG. 1, computing system 100 may comprise a performance degradation detector 112, which executes in main memory 104. Performance degradation detector 112 is configured to detect a degradation of an application executed by a processor of processor(s) 102 (and/or via a virtual machine launched and executing on the processor) that is caused by another computing process of the processor (and/or via another virtual machine launched and executing on the processor). Such processes and/or virtual machines are referred to as noisy neighbors herein. For instance, performance degradation detector 112 may be configured to measure the performance of read operations to data storage 106 and infer whether a decrease in performance is attributed to the other computing process. In particular, performance degradation detector 112 may be configured to detect and quantify a degradation of performance caused by noisy neighbors executing on the same processor of processor(s) 102 using storage segment coloring and timing measurements. As used herein, performance degradation refers to a reduction in performance (e.g., speed and/or reliability) that results in an application from performing its intended function in a timely fashion. Examples of performance degradation include, but are not limited to, slow read and/or write speeds, slow query performance, slow response times, etc. Additional details regarding performance degradation detector 112 are described below.

Figure 2:
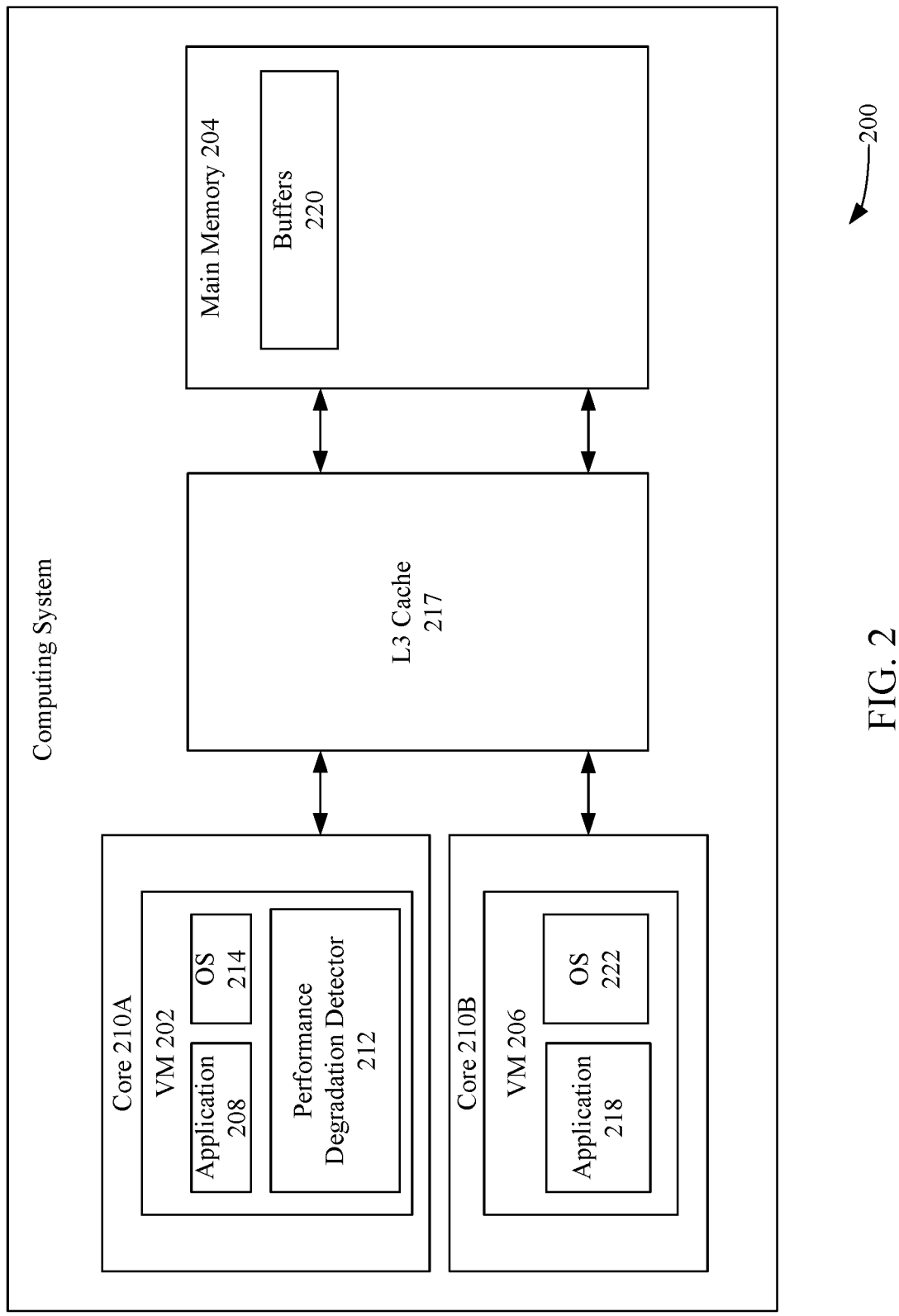
FIG. 2 shows a block diagram of an example computing system configured to detect a degradation in performance of an application that is caused by another computing device in accordance with another embodiment.

FIG. 2 shows a block diagram of an example computing system 200 configured to detect a degradation in performance of an application that is caused by another computing device in accordance with another example embodiment. Computing system 200 is an example of computing system 100, as described above with reference to FIG. 1. As shown in FIG. 2, system 200 comprises a first processor core 210A, a second processor core 210B, a main memory 204 and an L3 cache 217. Computing system 200 is also shown hosting a first virtual machine 202 and a second virtual machine 206, which execute on core 210A and core 210B, respectively. Although, it is noted that the embodiments described herein are not so limited. Cores 210A and 210B are examples of cores 110A and 110B, main memory 204 is an example of main memory 104, and L3 cache 217 is an example of L3 cache 117, as respectively described above with reference to FIG. 1. First virtual machine 202 is configured to execute a first application 208, a guest operating system 214, and a performance degradation detector 212, and second virtual machine 206 is configured to execute a second application 218 and a guest operating system 222. Performance degradation detector 212 is an example of performance degradation detector 112, as described above with reference to FIG. 1. Examples of guest operating systems 214 and 222 include, but are not limited to, MICROSOFT® WINDOWS® Operating System (OS), published by Microsoft Corporation of Redmond, Wash., LINUX®, and other UNIX®-based variants, etc.

In the example shown in FIG. 2, performance degradation detector 212 is configured to detect the degradation for application 208 that is attributable to other processes, such as application 218. Although, it is noted that this is purely exemplary and that performance degradation detector 212 may be configured to detect performance degradation for any application that executes in the same virtual machine as performance degradation detector 212. The foregoing may be performed as follows.

Performance degradation detector 212 may write data to various storage segments (e.g., cache lines) of L3 cache 217 of data storage by accessing the underlying main memory (i.e., main memory 204) that is being transparently cached. The cache lines to which data is written may be determined based on the configuration of L3 cache 217 and accessing the appropriate position in the main memory buffer (i.e., buffers 220, as described below) associated with those cache lines. To determine the configuration of L3 cache 217, performance degradation detector 212 may query one of core 210A or 210B for such information. For instance, each of cores 210A and 210B may comprise a CPUID (central processing unit (CPU) identification) register that comprises information that indicates the configuration of L3 cache 217. For instance, the CPUID register may indicate the size of L3 cache 217, the number of ways of associativity of L3 cache 217, and a number of cache lines per set.

After determining the configuration of L3 cache 217, performance degradation detector 212 is configured to allocate memory space in main memory 204 in order to access (read/write) certain cache lines of L3 cache 217 based on the determined configuration of L3 cache 217. For instance, performance degradation detector 212 is configured to arrange a set of physically contiguous buffers 220 in main memory 204 at various offsets suitable for covering an adjustable portion of certain cache lines in L3 cache 217 (e.g., a portion of cache lines in different sets of L3 cache 217). To allocate buffers 220, performance degradation detector 212 may examine virtual page-to-physical page mappings and perform memory page allocations accordingly. For instance, when performance degradation detector 212 is launched, a predetermined amount of virtual memory pages are allocated therefor. Performance degradation detector 212 may be configured to determine the physical memory pages (i.e., pages of main memory 204) to which the virtual memory pages are mapped. For instance, performance degradation detector 212 may query operating system 214, which maintains a mapping or table that maps virtual pages to physical pages. Using the determined mapping, performance degradation detector 212 performs physical page allocations in main memory 204 to arrange buffers 220 that are contiguous at different offsets such that portions of different cache lines in different sets in L3 cache 217 may be colored (i.e., written to). Buffers 220 are allocated such that each buffer of buffers 220 maps to specific areas (e.g., sets) of L3 cache 217. As the physical memory (e.g., main memory 204) is much larger than L3 cache 217, the foregoing techniques are performed to avoid cache collisions and ensure that different portions of L3 cache 217 are colored to increase sensitivity of performance degradation detector 212.

After allocating buffers 220, performance degradation detector 212 is configured to determine cache lines of L3 cache 217 to which data is to be written. In accordance with an embodiment, performance degradation detector 212 may determine the cache lines pseudo-randomly, but still deterministically, to avoid possible processor prefetch behavior that could affect timing results. For instance, performance degradation detector 212 may first determine the overall size of L3 cache 217 (e.g., as determined by querying the CPUID register). Performance degradation detector 212 may then determine an integer that is co-prime with the overall size. The integer is then multiplied by a multiplier (which may initially be set to the value of one). A modulo operation may then be performed with respect to the resulting value and the determined overall size of L3 cache 217 (i.e., the remainder of dividing the resulting integer by the overall size is determined). The resulting remainder value is then utilized as an index of L3 cache 217. That is, data is written to a cache line corresponding to the resulting remainder value. The multiplier is then incremented, and the process is repeated until a predetermined number of cache lines of L3 cache 217 have been colored.

In accordance with an embodiment, the predetermined number of cache lines is based on an intensity value, which specifies a percentage of L3 cache 217 that is to be colored. When the number of cache lines of L3 cache 217 is colored reaches or exceeds the intensity value, performance degradation detector 212 stops writing data to cache lines of L3 cache 217. The intensity value may be dynamically set based on whether or not performance degradation detector 212 is detecting noise generated from other applications. For instance, if performance degradation detector 212 is not detecting much noise, then the intensity value may be increased, thereby causing performance degradation detector 212 to color more cache lines of L3 cache 217.

In accordance with an embodiment, the data written to the cache lines of L3 cache 217 are determined in accordance with the pseudo-random technique described above. For example, for a given cache line, the value determined by multiplying the co-prime number and the current multiplier value may be the value written into the cache line. However, it is noted that any data value may be written to a cache line of L3 cache 217 (subject to additional cache subsystem write-back policy considerations that could affect other aspects of system utilization (e.g., cause interference) and timing results).

It is further noted that the co-prime number described above may be based on a number of ways supported by L3 cache 217 and/or the number of cache lines in each set of L3 cache 217. That is, a number that is co-prime with the number of ways supported by L3 cache 217 and/or the number of cache lines in each set of L3 cache 217 may be utilized rather than a number that is co-prime with the overall size (or total number of cache lines) of L3 cache 217.

The foregoing pseudo-random technique advantageously requires far less overhead than utilizing conventional random number generation-based techniques, and therefore, is much less likely to generate a significant level of noise in computing system 200. Moreover, such techniques circumvent various processor optimizations that normally would prevent certain cache lines from being written.

After cache lines of L3 cache 217 have been written to, performance degradation detector 212 may obtain various metrics associated with virtual machine 202. The metrics may be utilized to determine whether any processes internal to virtual machine 202 are causing degradation of the performance of application 208. This is because fluctuations in L3 cache 217 access timing could come from the virtual machine in which performance degradation detector 212 is executing (i.e., virtual machine 202). If the metrics are indicative of relatively inactive internal processes (which can be observed when performance degradation detector 212 is running inside virtual machine 202, but not in other virtual machines (e.g., virtual machine 206), then it can be inferred that the fluctuations are coming from another process outside of virtual machine 202. Examples of metrics include, but are not limited to, the amount of time for which a CPU (e.g., core 210A) was used for processing instructions of application 208 and/or operating system 214 (also referred to as core CPU time) in both kernel mode or application mode, a number of input/output operations performed by operating system 214 and/or application 208. Such metrics may be maintained by operating system 214 and/or determined based on information queried, by performance degradation detector 212, from operating system 214.

Performance degradation detector 212 may then perform a pattern of read operations to cache lines of L3 cache 217 and, based on the pattern of read operations, determine a performance metric that is indicative of a degradation of performance of application 208 that is attributable to another computing process external to virtual machine 202 (e.g., application 218). For instance, performance degradation detector 212 may issue one or more first read operations to the cache lines of L3 cache 217 that were written to by performance degradation detector 212, as described above. Performance degradation detector 212 then determines a first length of time for the data to be retrieved from the cache lines and/or received by performance degradation detector 212. These initial read operation(s) act as a baseline measure for determining the performance of the application being evaluated when no noisy neighbors are active. After waiting a predetermined time period, performance degradation detector 212 issues second read operation(s) to cache lines of L3 cache 217. Performance degradation detector 212 then determines a second length of time for the data to be retrieved from the cache lines and/or received by performance degradation detector 212 via the second read operation(s). Performance degradation detector 212 may then determine whether a difference between the first and second lengths of time exceeds a predetermined threshold (i.e., the second read operation(s) take longer to complete than the first read operation(s)). If performance degradation detector 212 determines that the difference between the first and second lengths of time exceed the predetermined threshold, then performance degradation detector 212 determine that the degradation in performance is attributed to the other computing process. The increase of time to complete the second read operation(s) would occur if the data was not retrievable via L3 cache 217 (i.e., the second read operation(s) result in a cache miss due to the data no longer residing in L3 cache 217), but instead retrieved from a higher level of memory (e.g., main memory 204) (which takes a significantly longer of time to retrieve data than retrieving data from L3 cache 217) This would occur, for example, if the data was evicted from L3 cache 217 as a result of operations performed by another application (e.g., either running in virtual machine 202 or another virtual machine (e.g., virtual machine 206)).

To determine the first length of time, performance degradation detector 212 may read a Time Stamp Counter (TSC) register of core 210A before issuing first read operation(s) to determine a first TSC value and read the TSC register after the first read operation(s) complete to determine a second TSC value. The TSC register stores a TSC value that is incremented for each CPU cycle (e.g., each ideal cycle) performed by core 210. Performance degradation detector 212 may then subtract the second TSC value from the first TSC value to determine the first length of time. Similarly, to determine the second length of time, performance degradation detector 212 may read the TSC register of core 210A before issuing second read operation(s) to determine a third TSC value and read the TSC register after the second read operation(s) complete to determine a fourth TSC value. Performance degradation detector 212 may then subtract the fourth TSC value from the second TSC value to determine the second length of time.

Performance degradation detector 212 may determine whether the difference between the second length of time and the first length of time exceeds a predetermined threshold. If the difference exceeds the predetermined threshold, then performance degradation detector 212 may determine that the degradation of performance of application 208 is attributed to another computing process (e.g., application 218). The foregoing takes into account the fact that read access times to L3 cache 217 from performance degradation detector 212 may vary. Read access times that exceed the maximum of this range may be considered to be caused by another computing process.

In accordance with an embodiment, the first read operation(s) and/or second read operation(s) may be issued in accordance with a one or more different patterns. Examples of such patterns include, but are not limited to, a full sequential scan-based pattern, in which each cache line is read in sequential order, a set-wise local-random-based pattern, in which certain cache of a particular set are read in a random fashion, etc. Utilization of such patterns may prevent certain CPU optimizations, such as, but not limited to, cache line prefetching, write coalescing and/or zero-store elimination, which would make it more difficult to carefully time individual cache accesses.

After cache lines of L3 cache 217 have been read a second time, performance degradation detector 212 may again obtain various metrics associated with virtual machine 202. Such metrics may be compared with the metrics obtained before performing the pattern of read operations described above to determine whether any processes internal to virtual machine 202 are causing degradation of the performance of application 208. If such metrics are indicative of internal processes, such metrics may be quantified and/or removed from the analysis of whether the degradation of performance was caused by a computing process external to virtual machine 202.

The difference in read time may be utilized as a performance metric that is indicative of the degradation of performance that measures the impact (or noise) from other workloads (e.g., application 218) through shared L3 cache 217 interference. The operations provided above (e.g., the pattern of read operations, metric determinations, and read time determinations) may be periodically performed to generate a time series of read time differences (i.e., a performance metric). The time series is utilized to track the noise detected in virtual machine 202 over the time. The time series may be utilized to infer the actual performance of application 208 being evaluated. For instance, the performance metric may be provided as an input to a machine learning model. The machine learning model is configured to output a performance metric that is indicative of the performance of the application absent the degradation attributable to the computing device.

The machine learning model may be trained utilizing data collected in a controlled environment. For instance, application 208 may be executed in isolation, without any other applications executing on other virtual machines. Performance metric for application 208 may be collected for application 208 to determine the performance of application 208 when no noise is in the system. Thereafter, different levels of noise may be injected during execution of application 208, and the performance of application 208 is measured with these different levels of noise. The determined performance information may be provided to a machine learning algorithm that learns a relationship between the amount of noise and the actual performance of application 208 (without the noise) and generates the machine learning model, which is configured to output the performance of application 208 given the detected amount of noise. The machine learning algorithm may utilize supervised or unsupervised-based techniques to generate the machine learning model.

After determining the true performance of application 208, application 208 may be optimized to improve the performance if the determined true performance is inadequate. For instance, one or more configuration settings of application 208, operating system 214, and/or core 210A may be changed in an attempt to achieve better performance. For instance, in an embodiment in which application 208 is a database application, some of the configuration settings that may be changed include, but not limited to, a buffer pool size, the number of threads that are dedicated to reading from a hard disk or writing back to database logs, synchronous logging activation/deactivation, etc. In certain situations, application 208 may be executed on a different computing device (e.g., a server in a cloud-based platform having a different configuration of CPU cores, memory, storage, etc.).

Figure 3:
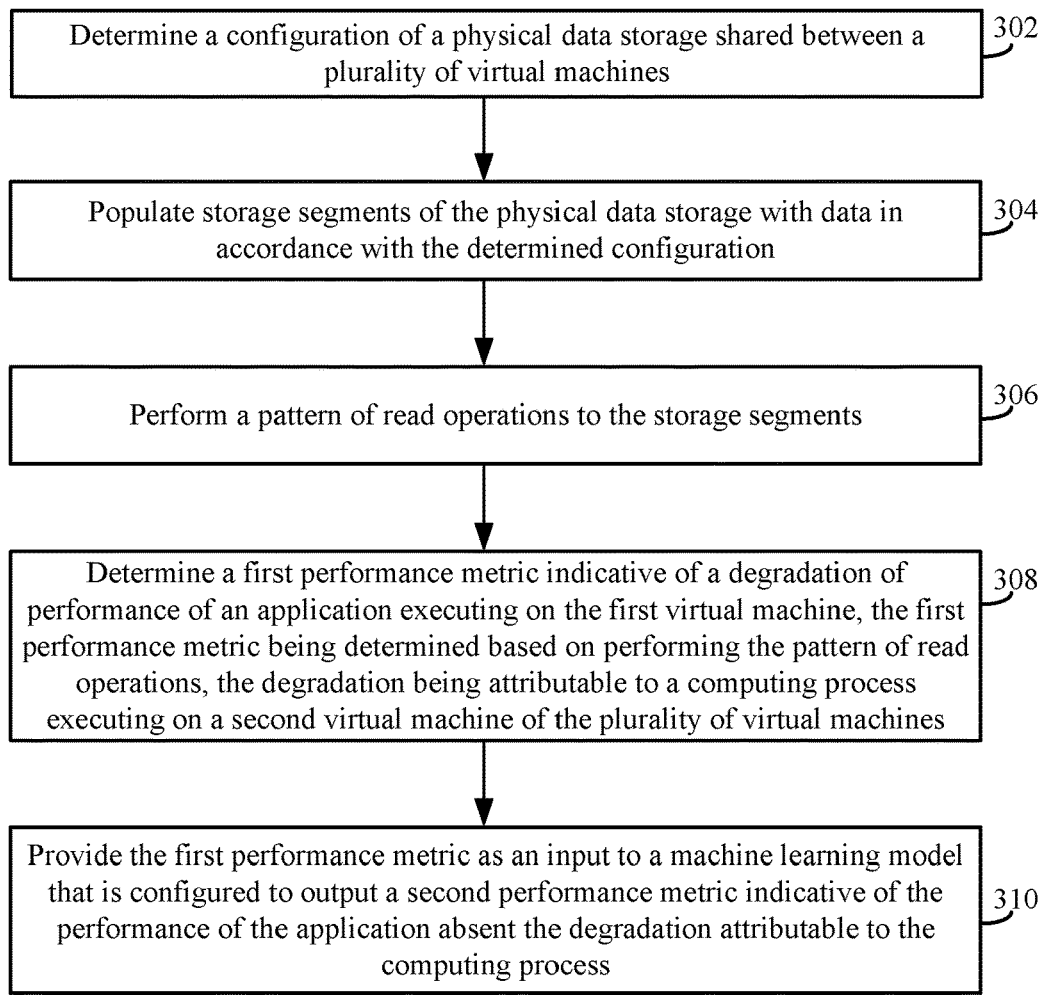
FIG. 3 shows a flowchart of a method for determining the performance of an application in accordance with an example embodiment.
Figure 4:
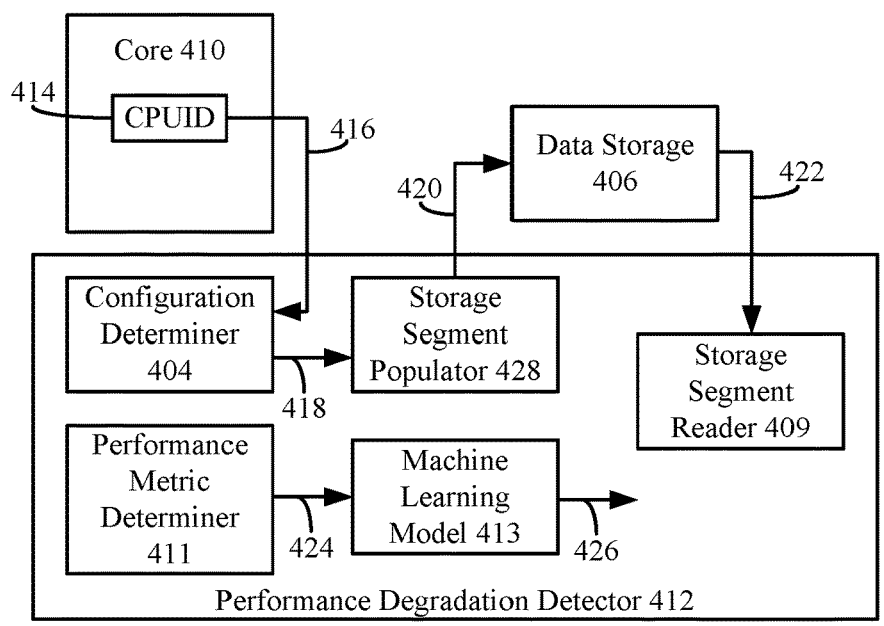
FIG. 4 depicts a block diagram of a system configured to determine the performance of an application in accordance with an example embodiment.

Accordingly, the performance of an application may be determined in many ways. For example, FIG. 3 shows a flowchart 300 of a method for determining the performance of an application in accordance with an example embodiment. In an embodiment, flowchart 300 may be implemented by system 400 of FIG. 4. Accordingly, flowchart 300 will be described with reference to FIG. 4. FIG. 4 depicts a block diagram of a system 400 configured to determine the performance of an application in accordance with example embodiment. As shown in FIG. 4, system 400 comprises a performance degradation detector 412, a CPU core 410, and data storage 406. Performance degradation detector 412 is an example of performance degradation detector 112 and performance degradation detector 212, as respectively described above with reference to FIGS. 1 and 2. CPU core 410 is an example of CPU cores 110A-110D and CPU core 210A, as respectively described above with reference to FIGS. 1 and 2. Data storage 406 is an example of data storage 106 and L3 cache 206 and L3 cache 217, as respectively described above with reference to FIGS. 1 and 2. Core 410 is shown as comprising a CPUID register 414; however, it is noted that core 410 may comprise any number and/or types of registers. Other structural and operational embodiments will be apparent to persons skilled in the relevant art(s) based on the discussion regarding flowchart 300 and system 400 of FIG. 4.

Flowchart 300 begins with step 302. In step 302, a configuration of a physical data storage shared between a plurality of virtual machines is determined. For example, with reference to FIG. 4, data storage 406 is shared between a plurality of virtual machines (e.g., virtual machines 202 and 206, as shown in FIG. 2). Configuration determiner 404 determines the configuration of data storage 406.

In accordance with one or more embodiments, a CPUID register that specifies the configuration of the data storage is read to determine the configuration of the physical data storage. For example, with reference to FIG. 4, configuration determiner 404 reads data 416 from CPUID register 414 and determines the configuration of data storage 406 based thereon. The configuration includes a size of a size of data storage 406, a set associativity scheme utilized by data storage 406 (e.g., in an embodiment in which data storage 406 is a cache), or a number of lines in each set of data storage 406 (e.g., in an embodiment in which data storage 406 is a cache). Configuration determiner 404 may provide the determined configuration (shown as configuration 418) to storage segment populator 428.

In step 304, storage segments of the physical data storage are populated with data in accordance with the determined configuration. For example, with reference to FIG. 4, storage segment populator 428 may populate storage segments of data storage 406 in accordance with the determined configuration. For instance, storage segment populator 428 may issue write operations 420 that write data to certain storage segments of data storage 406. Additional details regarding writing data to storage segments are provided below with reference to FIGS. 5 and 6.

In accordance with one or more embodiments, the storage segments comprise at least one of cache lines of a cache associated with a processor circuit on which the plurality of virtual machines executes, storage sectors of a hard disk drive shared by the plurality of virtual machines, or storage sectors of a solid state drive shared by the plurality of virtual machines. For example, with reference to FIG. 4, storage segments of data storage 406 comprise at least one of cache lines of a cache (e.g., L3 cache 117 or L3 cache 217) of a processor circuit (e.g., processor(s) 102) on which the plurality of virtual machines (e.g., executes, storage sectors of a hard disk drive (e.g., disk drive(s) 114) shared by the plurality of virtual machines, or storage sectors of a solid state drive (e.g., disk drive(s) 114) shared by the plurality of virtual machines.

In accordance with one or more embodiments, the cache is shared by a plurality of processing cores (processor cores 110A-110D) of a processor (e.g., processor 102). For instance, the cache may be an L3 cache. (e.g., L3 cache 117).

In step 306, a pattern of read operations to the storage segments is performed. For example, with reference to FIG. 4, storage segment reader 409 performs a pattern of read operations 422 to the storage segments of data storage 406. Additional details regarding performing the pattern of read operations are provided below with reference to FIGS. 7 and 8.

In step 308, a first performance metric indicative of a degradation of performance of an application executing on the first virtual machine is determined. The first performance metric is determined based on performing the pattern of read operations, and the degradation is attributable to a computing process executing on a second virtual machine of the plurality of virtual machines. For example, with reference to FIG. 4, performance metric determiner 411 may be configured to determine a first performance metric 424 indicative of a degradation of performance of an application (e.g., application 208, as shown in FIG. 2) executing on the first virtual machine (e.g., virtual machine 202, as shown in FIG. 2). The first performance metric is determined based on performing the pattern of read operations 422, and the degradation is attributable to a computing process (e.g., application 218, as shown in FIG. 2) executing on a second virtual machine (e.g., virtual machine 206, as shown in FIG. 2) of the plurality of virtual machines.

In step 310, the first performance metric is provided as an input to a machine learning model that is configured to output a second performance metric indicative of the performance of the application absent the degradation attributable to the computing process. For example, with reference to FIG. 4, performance metric determiner 411 provides first performance metric 424 as an input to machine learning model 413 that is configured to output a second performance metric 426 indicative of the performance of the application (e.g., application 208) absent the degradation attributable to the computing process (e.g., application 218).

Figure 5:
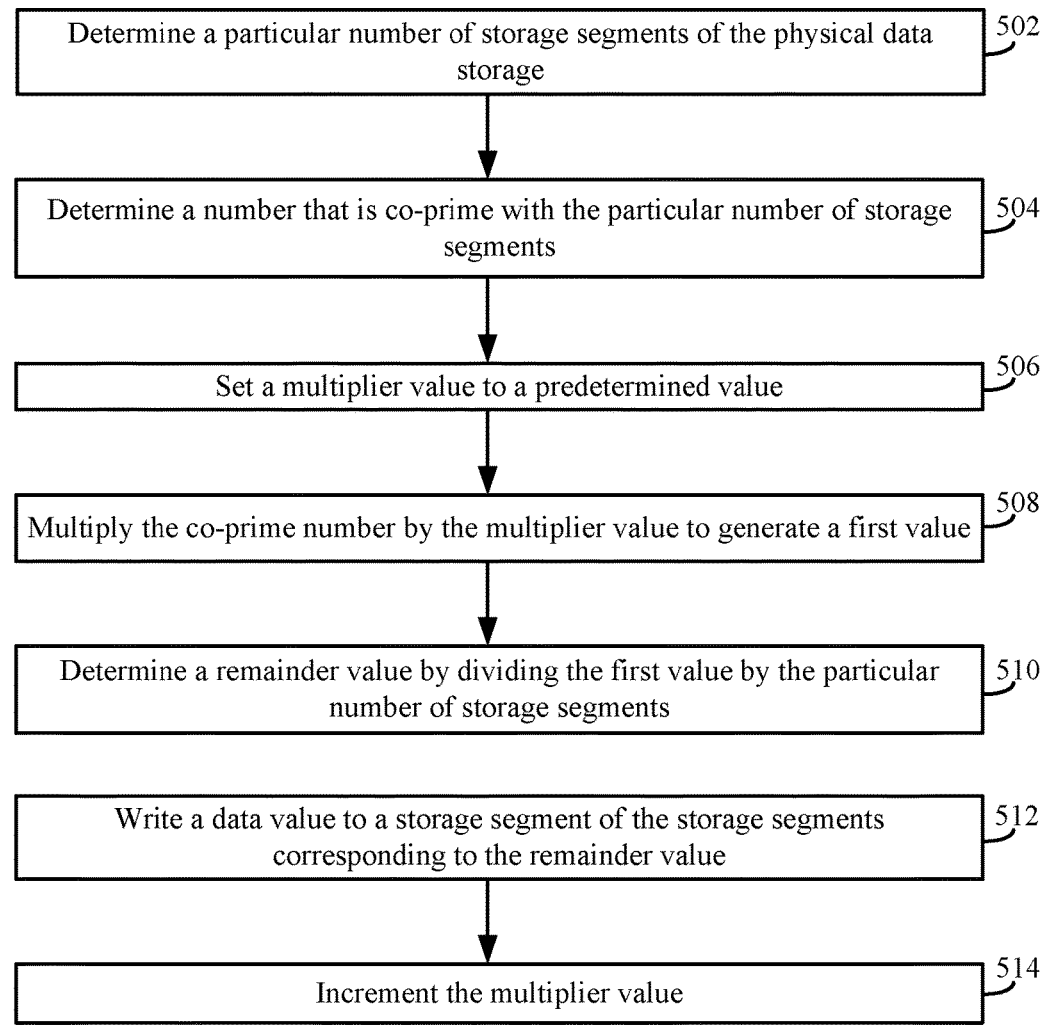
FIG. 5 shows a flowchart of a method for populating storage segments in accordance with an example embodiment.
Figure 6:
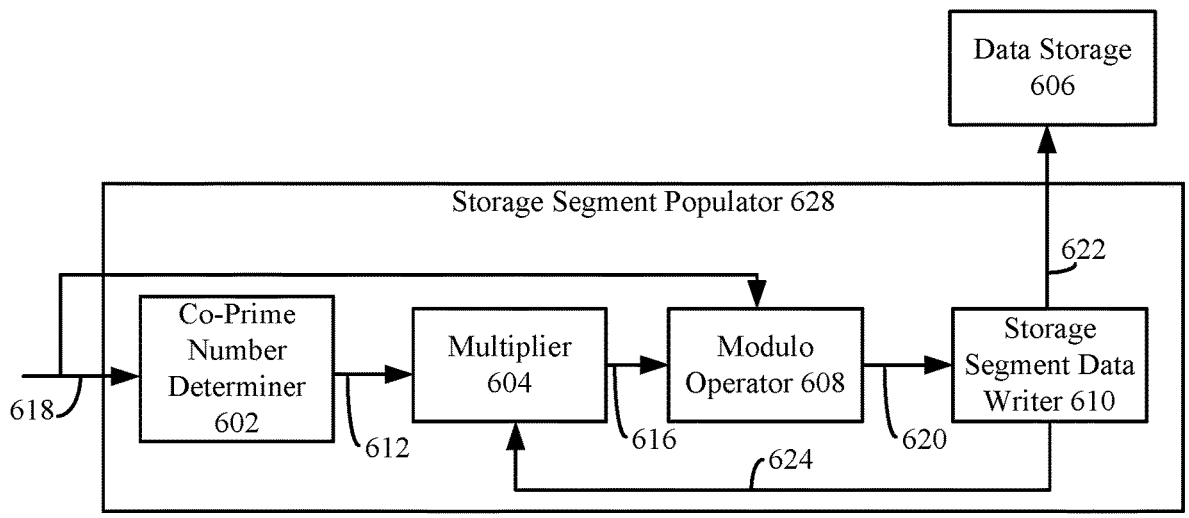
FIG. 6 depicts a block diagram of a system configured to populate storage segments of a data storage in accordance with an example embodiment.

FIG. 5 shows a flowchart 500 of a method for populating storage segments in accordance with an example embodiment. In an embodiment, flowchart 500 may be implemented by system 600 of FIG. 6. Accordingly, flowchart 500 will be described with reference to FIG. 6. FIG. 6 depicts a block diagram of a system 600 configured to populate storage segments of a data storage 606 in accordance with an example embodiment. As shown in FIG. 6, system 600 comprises data storage 606 and a storage segment populator 628. Data storage 606 and storage segment populator 628 are examples of data storage 406 and storage segment populator 428, as respectively described above with reference to FIG. 4. As also shown in FIG. 6, storage segment populator 628 comprises a co-prime number determiner 602, a multiplier 604, a modulo operator 608, and a storage segment data writer 610. Other structural and operational embodiments will be apparent to persons skilled in the relevant art(s) based on the discussion regarding flowchart 500 and system 600 of FIG. 6. It is noted that while FIG. 5 describes steps for determining storage segments to write data to based on a total number of storage segments of a data storage, the embodiments described herein are not so limited. For example, in an embodiment in which data storage 606 comprises a cache, the storage segment determination may be based on a number of storage segments in a set of the cache or the number of ways supported by the cache.

Flowchart 500 begins with step 502. In step 502, a particular number of storage segments of the physical data storage is determined. For example, with reference to FIG. 6, co-prime number determiner 602 and modulo operation 608 may receive configuration 618, which may specify the configuration of data storage 606. Configuration 618 is an example of configuration 418, as described above with reference to FIG. 4. In an embodiment in which data storage 606 is a cache, such as an L3 cache, configuration 618 may specify the number of ways supported by data storage 606, the number of cache lines in each set of data storage 606 and/or the total number of storage segments of data storage 606, depending on the configuration data storage 606. Configuration 618 is an example of configuration 418, as described above with reference to FIG. 4. Co-prime number determiner 602 may determine the particular number of storage segments of data storage 606 based on configuration 618. For instance, in an embodiment in which data storage 606 is a cache, depending on the configuration of data storage 606, the particular number may correspond to the number of ways supported by data storage 606, the number of cache lines in each set of data storage 606, or the total number of storage segments of data storage 606.

In step 504, a number that is co-prime with the particular number of storage segments is determined. For example, with reference to FIG. 6, co-prime number determiner 602 determines a number 612 that is co-prime with the particular number of storage segments of data storage 606. For instance, suppose the number of storage segments is 10. In this example, co-prime number determiner 602 may determine that the number 7 is co-prime the number 10. Co-prime number 612 is provided to multiplier 604.

In step 506, a multiplier value is set to a predetermined value. For example, with reference to FIG. 6, multiplier 604 may initialize a multiplier value (e.g., to the value of 1).

Steps 508-514 are performed for each iteration of a plurality of predetermined iterations. The number of predetermined iterations to be performed may be in accordance with the intensity value described above, where a certain percentage of storage segments of data storage 606 (e.g., a certain percentage of the overall size of data storage 606, a certain percentage of a number of cache lines in each set of a cache of data storage 606, etc.) is populated with data.

In step 508, the co-prime number is multiplied by the multiplier value to generate a first value. For example, with reference to FIG. 6, multiplier 604 multiplies co-prime number 612 by the multiplier value to generate a first value 616. First value 616 is provided to modulo operator 608.

In step 510, a remainder value is determined by dividing the first value by the particular number of storage segments. For example, with reference to FIG. 6, modulo operator 608 performs a modulo operation to determine a remainder value 620 that is determined based on by dividing the particular number of storage segments (as specified by configuration 618) and first value 616.

In step 512, a data value is written to a storage segment of the storage segments corresponding to the remainder value. For example, with reference to FIG. 6, storage segment data writer 610 performs a write operation 622 to write data to a storage segment of data storage 606 corresponding to the remainder value data.

In accordance with one or more embodiments, the data value written to the storage segment is equal to the first value. For example, with reference to FIG. 6, write operation 622 indicates that a data value equal to the first value is to be written to a storage segment corresponding to the remainder value.

In step 514, the multiplier value is incremented. For example, with reference to FIG. 6, storage segment data writer 610 may send a command 624 to multiple 604 that causes the multiplier to increment the multiplier value, and steps 508-514 are repeated.

As described above, during a first iteration, the co-prime number 7 is multiplied by the initial multiplier value (e.g., 1) to generate a first value of 7. The first value of 7 is divided by the total number of storage segments (e.g., 10) to determine a remainder value of 7. The remainder value of 7 is utilized as an index into data storage 606 to determine a storage segment to which data is to be written to. In a simple example, a remainder value of 7 corresponds to the $7^{th}$ storage segment of data storage 606. During a second iteration, the multiplier value is now incremented to the value of 2. Thus, the first value is now equal to 14 (7 times 2), and the remainder value is 4 (the remainder of dividing 14 by 10). Thus, in the second iteration, the remainder value of 10 is utilized to determine a storage segment to which data is to be written to (e.g., the $10^{th}$ storage segment). During a third iteration, the multiplier value is now incremented to the value of 3. Thus, the first value is now equal to 21 (7 times 3), and the remainder value is 1 (the remainder of dividing 21 by 10). Thus, in the third iteration, the remainder value of 1 is utilized to determine a storage segment to which data is to be written to (e.g., the $1^{st}$ storage segment), and so on and so forth.

Figure 7:
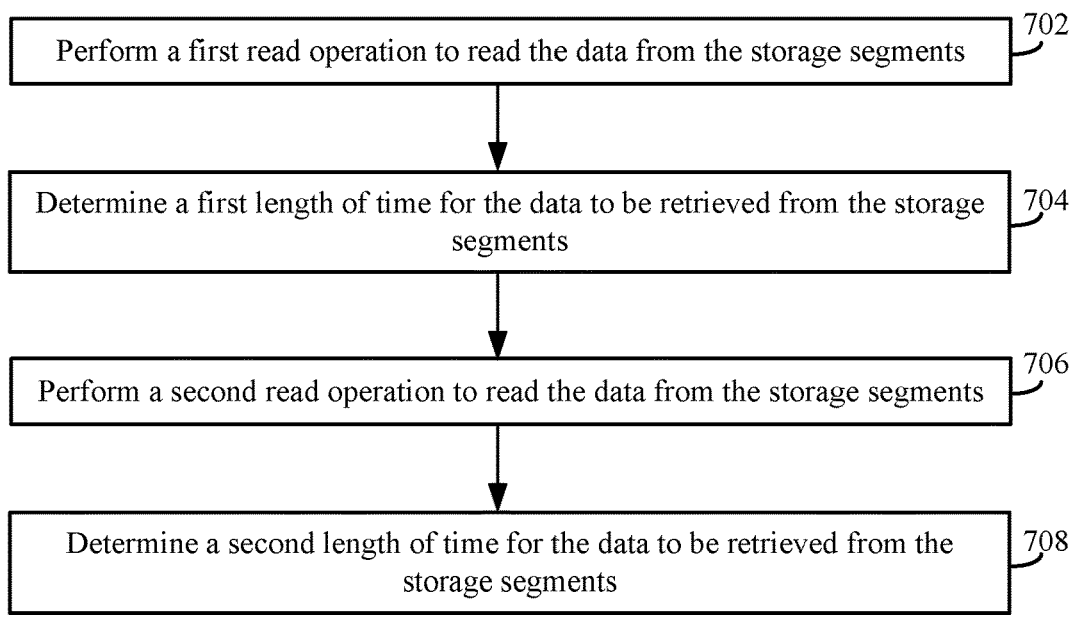
FIG. 7 shows a flowchart of a method for performing a pattern of read operations and measuring the performance of the read operations in accordance with another example embodiment.
Figure 8:
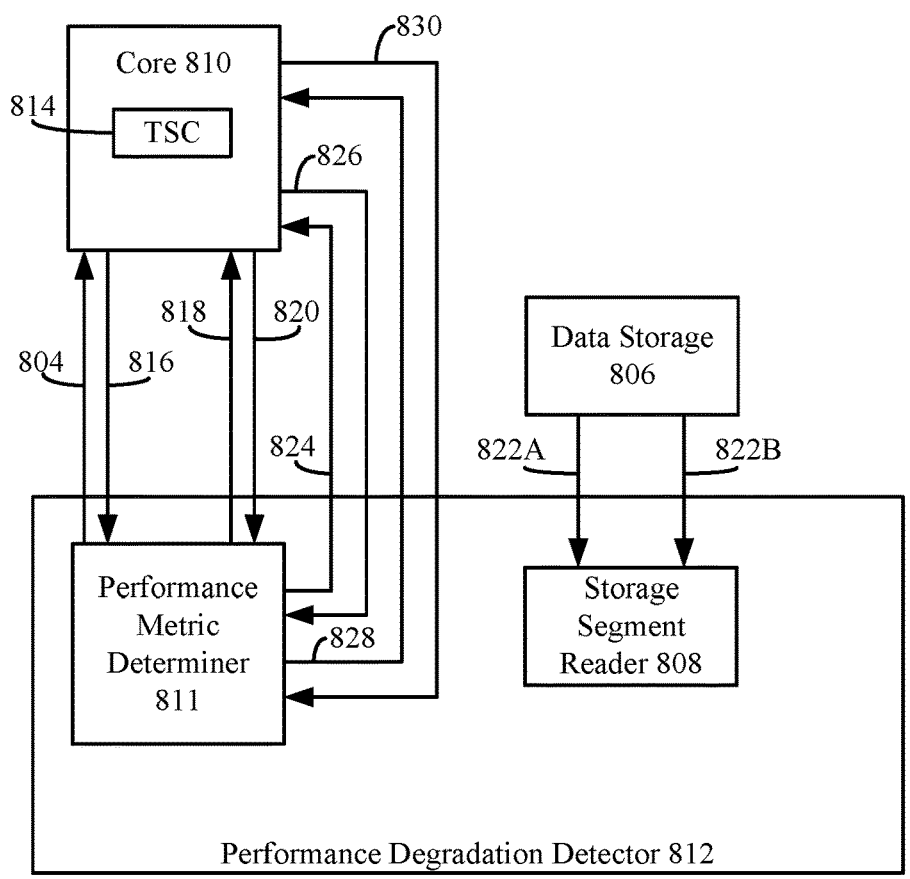
FIG. 8 depicts a block diagram of a system configured to perform a pattern of read operations and measure the performance of the read operations in accordance with an example embodiment.

FIG. 7 shows a flowchart 700 of a method for performing a pattern of read operations and measuring the performance of the read operations in accordance with another example embodiment. In an embodiment, flowchart 700 may be implemented by system 800 of FIG. 8. Accordingly, flowchart 700 will be described with reference to FIG. 8. FIG. 8 depicts a block diagram of a system 800 configured to perform a pattern of read operations and measure the performance of the read operations in accordance with an example embodiment. As shown in FIG. 8, system 800 comprises a core 810, a data storage 806, and a performance degradation detector 812. Core 810, data storage 806, and performance degradation detector 812 are examples of core 410, data storage 406, and performance degradation detector 412, as described above with reference to FIG. 4. Performance degradation detector 812 comprises a performance metric determiner 811 and a storage segment reader 808, which are examples of performance metric determiner 411 and storage segment reader 409, as described above with reference to FIG. 4. Additional components of performance degradation detector 812 described above are not shown for the sake of brevity. As further shown in FIG. 8, core 810 comprises a TSC register 814; however, it is noted that core 810 may comprise any number and/or types of registers. Other structural and operational embodiments will be apparent to persons skilled in the relevant art(s) based on the discussion regarding flowchart 700 and system 800 of FIG. 8.

Flowchart 700 begins with step 702. In step 702, a first read operation is performed to read the data from the storage segments. For example, with reference to FIG. 8, storage segment reader 808 issues a first read operation 822A to read data from the storage segments of data storage 806. First read operation 822A is an example of read operation 422, as described above with reference to FIG. 4.

In step 704, a first length of time for the data to be retrieved from the storage segments is determined. For example, with reference to FIG. 8, before first read operation 822A is issued, performance metric determiner 811 may issue a first command 804 to core 810 to read TSC register 814. TSC register 814 returns a TSC value 816, which indicates the total number of CPU cycles performed by core 810 before first read operation 822A is issued. After the data is retrieved from the storage segments, performance metric determiner 811 may wait a predetermined time period and issue a second command 818 to core 810 to read TSC register 814 after expiration of the predetermined time period. TSC register 814 returns an updated TSC value 820. Performance metric determiner 811 may subtract TSC value 816 from TSC value 820 to determine the first length of time.

In step 706, a second read operation is performed to read the data from the storage segments. For example, with reference to FIG. 8, storage segment reader 808 issues a second read operation 822B to read data from the storage segments of data storage 806. Second read operation 822B is an example of read operation 422, as described above with reference to FIG. 4.

In step 710, a second length of time for the data to be retrieved from the storage segments is determined. For example, with reference to FIG. 8, before second read operation 822B is issued, performance metric determiner 811 may issue a third command 824 to core 810 to read TSC register 814. TSC register 814 returns a TSC value 826, which indicates the total number of CPU cycles performed by core 810 before second read operation 822B is issued. After the data is retrieved from the storage segments, performance metric determiner 811 may wait a predetermined time period and issue a fourth command 828 to core 810 to read TSC register 814 after expiration of the predetermined time period. TSC register 814 returns an updated TSC value 830. Performance metric determiner 811 may subtract TSC value 826 from TSC value 830 to determine the second length of time.

In accordance with one or more embodiments, determining the first performance metric (as described above in step 308 of FIG. 3, comprises determining that a difference between the second length of time and the first length of time exceeds a predetermined threshold, and responsive to determining that the difference exceeds the predetermined threshold, determining that the degradation of performance of the application is attributed to the computing process, the first performance metric being equal to the difference. For example, with reference to FIG. 8, performance metric determiner 811 may determine whether the difference between the second length of time and the first length of time exceeds a predetermined threshold. If the difference exceeds the predetermined threshold, then performance metric determiner 811 may determine that the degradation of performance of the application being evaluated (e.g., application 208, as shown in FIG. 2) is attributed to another computing process (e.g., application 218, as shown in FIG. 2). The foregoing takes into account the fact that read access times to data storage 806 from storage segment reader 808 may vary. Read access times that exceed the maximum of this range may be considered to be caused by another computing process.

III. Example Computer System Implementation

The systems and methods described above in reference to FIGS. 1-8, may be implemented in hardware, or hardware combined with one or both of software and/or firmware. For example, system 900 of FIG. 9 may be used to implement any of performance degradation detector 112, application 208, application 218, operating system 214, operating system 222, performance degradation detector 212, performance degradation detector 412, configuration determiner 404, storage segment populator 428, storage segment reader 409, performance metric determiner 411, machine learning model 413, storage segment populator 628, co-prime number determiner 602, multiplier 604, modulo operator 608, storage segment data writer 610, performance degradation detector 812, performance metric determiner 811, and/or storage segment reader 808, and/or any of the components respectively described therein, and flowcharts 300, 500, and/or 700 may be each implemented as computer program code/instructions configured to be executed in one or more processors and stored in a computer readable storage medium. Alternatively, any of processor(s) 102, main memory 104, data storage 106, core 210A, 210B, L3 cache 217, main memory 204, core 410, data storage 406, data storage 606, core 810, data storage 806, performance degradation detector 112, application 208, application 218, operating system 214, operating system 222, performance degradation detector 212, performance degradation detector 412, configuration determiner 404, storage segment populator 428, storage segment reader 409, performance metric determiner 411, machine learning model 413, storage segment populator 628, co-prime number determiner 602, multiplier 604, modulo operator 608, storage segment data writer 610, performance degradation detector 812, performance metric determiner 811, and/or storage segment reader 808, and/or any of the components respectively described therein, and flowcharts 300, 500, and/or 700 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions. The description of system 900 provided herein is provided for purposes of illustration, and is not intended to be limiting. Embodiments may be implemented in further types of computer systems, as would be known to persons skilled in the relevant art(s).

Figure 9:
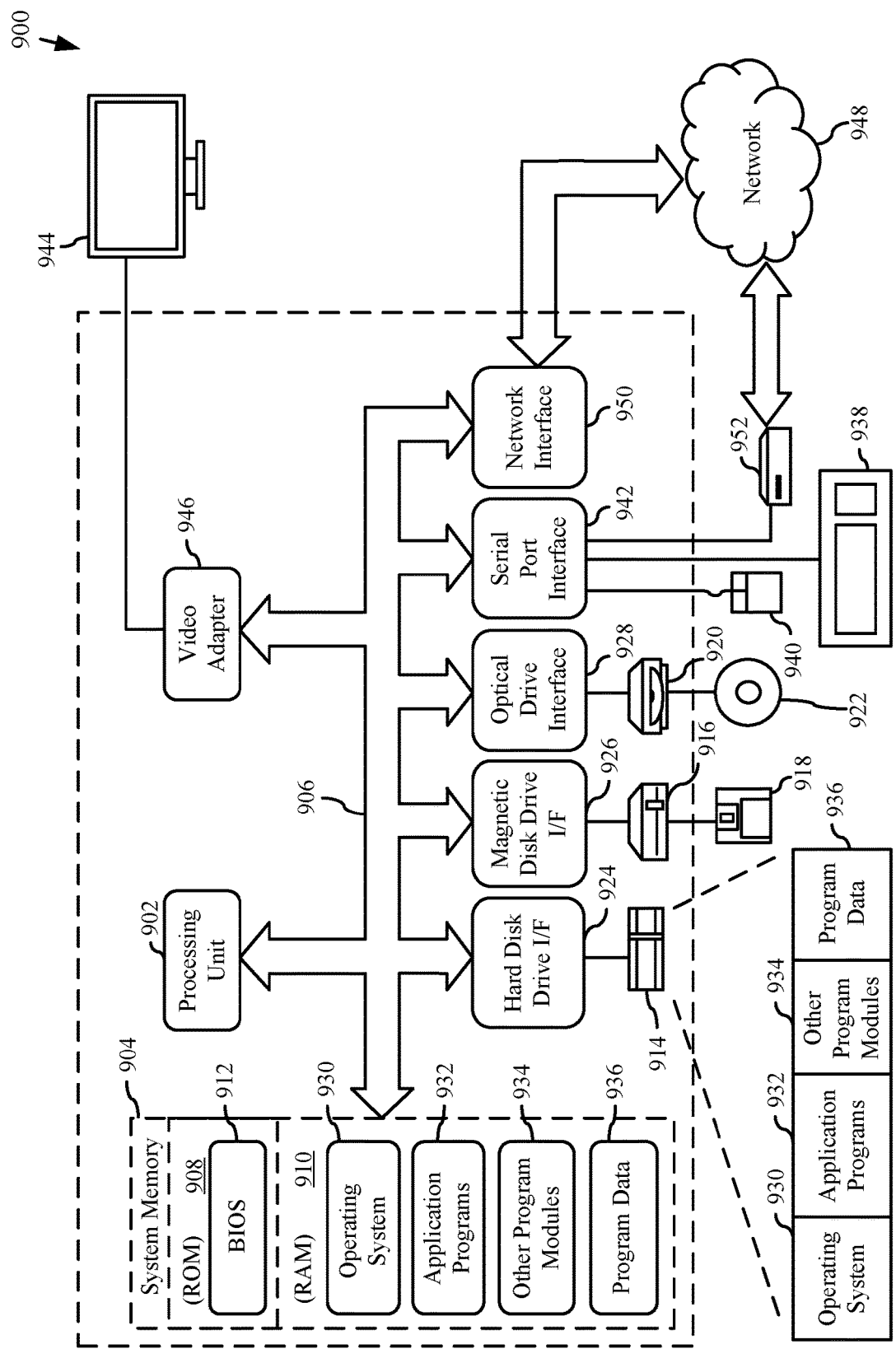
FIG. 9 is a block diagram of an example processor-based computer system that may be used to implement various embodiments.

As shown in FIG. 9, system 900 includes a processing unit 902, a system memory 904, and a bus 906 that couples various system components including system memory 904 to processing unit 902. Processing unit 902 may comprise one or more circuits, microprocessors or microprocessor cores. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

System 900 also has one or more of the following drives: a disk drive 914 (e.g., a hard disk drive or a solid state drive) for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, BLU-RAY™ disk or other optical media. Disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as solid state drives, flash memory cards, digital video disks, random access memories (RAMs), read only memories (ROM), and the like.

A number of program modules may be stored on the hard disk, magnetic disk, optical disk, ROM, or RAM. These program modules include an operating system 930, one or more application programs 932, other program modules 934, and program data 936. In accordance with various embodiments, the program modules may include computer program logic that is executable by processing unit 902 to perform any or all of the functions and features of any of performance degradation detector 112, application 208, application 218, operating system 214, operating system 222, performance degradation detector 212, performance degradation detector 412, configuration determiner 404, storage segment populator 428, storage segment reader 409, performance metric determiner 411, machine learning model 413, storage segment populator 628, co-prime number determiner 602, multiplier 604, modulo operator 608, storage segment data writer 610, performance degradation detector 812, performance metric determiner 811, and/or storage segment reader 808, and/or any of the components respectively described therein, and flowcharts 300, 500, and/or 700, as described above. The program modules may also include computer program logic that, when executed by processing unit 902, causes processing unit 902 to perform any of the steps of any of the flowcharts of FIGS. 3, 5, and 7, as described above.

A user may enter commands and information into system 900 through input devices such as a keyboard 938 and a pointing device 940 (e.g., a mouse). Other input devices (not shown) may include a microphone, joystick, game controller, scanner, or the like. In one embodiment, a touch screen is provided in conjunction with a display 944 to allow a user to provide user input via the application of a touch (as by a finger or stylus for example) to one or more points on the touch screen. These and other input devices are often connected to processing unit 902 through a serial port interface 942 that is coupled to bus 906, but may be connected by other interfaces, such as a parallel port, game port, or a universal serial bus (USB). Such interfaces may be wired or wireless interfaces.

Display 944 is connected to bus 906 via an interface, such as a video adapter 946. In addition to display 944, system 900 may include other peripheral output devices (not shown) such as speakers and printers.

System 900 is connected to a network 948 (e.g., a local area network or wide area network such as the Internet) through a network interface 950, a modem 952, or other suitable means for establishing communications over the network. Modem 952, which may be internal or external, is connected to bus 906 via serial port interface 942.

As used herein, the terms "computer program medium," "computer-readable medium," and "computer-readable storage medium" are used to generally refer to memory devices or storage structures such as the hard disk associated with disk drive 914, removable magnetic disk 918, removable optical disk 922, as well as other memory devices or storage structures such as flash memory cards, digital video disks, random access memories (RAMs), read only memories (ROM), and the like. Such computer-readable storage media are distinguished from and non-overlapping with communication media and modulated data signals (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media. Embodiments are also directed to such communication media that are separate and non-overlapping with embodiments directed to computer-readable storage media.

As noted above, computer programs and modules (including application programs 932 and other program modules 934) may be stored on the hard disk, magnetic disk, optical disk, ROM, or RAM. Such computer programs may also be received via network interface 950, serial port interface 942, or any other interface type. Such computer programs, when executed or loaded by an application, enable system 900 to implement features of embodiments discussed herein. Accordingly, such computer programs represent controllers of the system 900.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, solid state drives, floppy disks, CD ROMs, DVD ROMs, zip disks, tapes, magnetic storage devices, optical storage devices, MEMs, nanotechnology-based storage devices, and the like.

IV. Further Example Embodiments

A system comprising at least one processor circuit comprising a plurality of processor cores, a physical data storage, and at least one memory that stores program configured to be executed by the at least one processor circuit. The program code comprises a performance degradation detector configured to: determine a configuration of the physical data storage, the physical data storage shared between a plurality of virtual machines executing on the system; populate storage segments of the physical data storage with data in accordance with the determined configuration; perform a pattern of read operations to the storage segments; determine a first performance metric indicative of a degradation of performance of an application executing on the first virtual machine, the first performance metric being determined based on performing the pattern of read operations, the degradation being attributable to a computing process executing on a second virtual machine of the plurality of virtual machines; and provide the first performance metric as an input to a machine learning model that is configured to output a second performance metric indicative of the performance of the application absent the degradation attributable to the computing process.

In one implementation of the foregoing system, the storage segments comprise at least one of: cache lines of a cache associated with the at least one processor circuit on which the plurality of virtual machines executes; storage sectors of a hard disk drive shared by the plurality of virtual machines; or storage sectors of a solid state drive shared by the plurality of virtual machines.

In one implementation of the foregoing system, the performance degradation detector is further configured to: read a central processing unit identification (CPUID) register of the at least one processor circuit that specifies a configuration of the cache, the cache configuration comprising at least one of: a size of the cache; a set associativity scheme utilized by the cache; or a number of lines in each set of the cache.

In one implementation of the foregoing system, the cache is shared by the plurality of processing cores.

In one implementation of the foregoing system, the performance degradation detector is further configured to: determine a particular number of storage segments of the physical data storage; determine a number that is co-prime with the particular number of storage segments; set a multiplier value to a predetermined value; and for each iteration of a plurality of predetermined iterations: multiply the co-prime number by the multiplier value to generate a first value; determine a remainder value by dividing the first value by the particular number of storage segments; write a data value to a storage segment of the storage segments corresponding to the remainder value; and increment the multiplier value.

In one implementation of the foregoing system, the data value is equal to the first value.

In one implementation of the foregoing system, the performance degradation detector is further configured to: perform a first read operation to read the data from the storage segments; determine a first length of time for the data to be retrieved from the storage segments; perform a second read operation to read the data from the storage segments; and determine a second length of time for the data to be retrieved from the storage segments.

In one implementation of the foregoing system, the performance degradation detector is further configured to: determine that a difference between the second length of time and the first length of time exceeds a predetermined threshold; and responsive to a determination that the difference exceeds the predetermined threshold, determining that the degradation of performance of the application is attributed to the computing process, the first performance metric being equal to the difference.

A method is also described herein. The method includes: determining a configuration of a physical data storage shared between a plurality of virtual machines; populating storage segments of the physical data storage with data in accordance with the determined configuration; performing a pattern of read operations to the storage segments; determining a first performance metric indicative of a degradation of performance of an application executing on the first virtual machine, the first performance metric being determined based on performing the pattern of read operations, the degradation being attributable to a computing process executing on a second virtual machine of the plurality of virtual machines; and providing the first performance metric as an input to a machine learning model that is configured to output a second performance metric indicative of the performance of the application absent the degradation attributable to the computing process.

In one implementation of the foregoing method, the storage segments comprise at least one of: cache lines of a cache associated with a processor circuit on which the plurality of virtual machines executes; storage sectors of a hard disk drive shared by the plurality of virtual machines; or storage sectors of a solid state drive shared by the plurality of virtual machines.

In another implementation of the foregoing method, determining the configuration of the physical data storage comprises: reading a central processing unit identification (CPUID) register that specifies a configuration of the cache, the cache configuration comprising at least one of: a size of the cache; a set associativity scheme utilized by the cache; or a number of lines in each set of the cache.

In another implementation of the foregoing method, populating the storage segments comprises: determining a particular number of storage segments of the physical data storage; determining a number that is co-prime with the particular number of storage segments; setting a multiplier value to a predetermined value; and for each iteration of a plurality of predetermined iterations: multiplying the co-prime number by the multiplier value to generate a first value; determining a remainder value by dividing the first value by the particular number of storage segments; writing a data value to a storage segment of the storage segments corresponding to the remainder value; and incrementing the multiplier value.

In another implementation of the foregoing method, the data value is equal to the first value.

In another implementation of the foregoing method, performing the pattern of read operations to the physical data storage segments comprises: performing a first read operation to read the data from the storage segments; determining a first length of time for the data to be retrieved from the storage segments; performing a second read operation to read the data from the storage segments; and determining a second length of time for the data to be retrieved from the storage segments.

In another implementation of the foregoing method, determining the first performance metric comprises: determining that a difference between the second length of time and the first length of time exceeds a predetermined threshold; and responsive to determining that the difference exceeds the predetermined threshold, determining that the degradation of performance of the application is attributed to the computing process, the first performance metric being equal to the difference.

A computer-readable storage medium having program instructions recorded thereon that, when executed by at least one processor, perform a method. The method includes: determining a configuration of a physical data storage shared between a plurality of virtual machines; populating storage segments of the physical data storage with data in accordance with the determined configuration; performing a pattern of read operations to the storage segments; determining a first performance metric indicative of a degradation of performance of an application executing on the first virtual machine, the first performance metric being determined based on performing the pattern of read operations, the degradation being attributable to a computing process executing on a second virtual machine of the plurality of virtual machines; and providing the first performance metric as an input to a machine learning model that is configured to output a second performance metric indicative of the performance of the application absent the degradation attributable to the computing process.

In another implementation of the foregoing computer-readable storage medium, the storage segments comprise at least one of: cache lines of a cache associated with the processor on which the plurality of virtual machines executes; storage sectors of a hard disk drive shared by the plurality of virtual machines; or storage sectors of a solid state drive shared by the plurality of virtual machines.

In another implementation of the foregoing computer-readable storage medium, said determining the configuration of the physical data storage comprises: reading a central processing unit identification (CPUID) register that specifies a configuration of the cache, the cache configuration comprising at least one of: a size of the cache; a set associativity scheme utilized by the cache; or a number of lines in each set of the cache.

In another implementation of the foregoing computer-readable storage medium, said populating the storage segments comprises: determining a particular number of storage segments of the physical data storage; determining a number that is co-prime with the particular number of storage segments; setting a multiplier value to a predetermined value; and for each iteration of a plurality of predetermined iterations: multiplying the co-prime number by the multiplier value to generate a first value; determining a remainder value by dividing the first value by the particular number of storage segments; writing a data value to a storage segment of the storage segments corresponding to the remainder value; and incrementing the multiplier value.

In another implementation of the foregoing computer-readable storage medium, the data value is equal to the first value.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A system, comprising:
   at least one processor circuit comprising a plurality of processor cores;
   physical data storage; and
   at least one memory that stores program code configured to be executed by the at least one processor circuit, the program code comprising:
   a performance degradation detector configured to:
      determine a configuration of the physical data storage, the physical data storage shared between a plurality of virtual machines executing on the system;
      populate storage segments of the physical data storage with data in accordance with the determined configuration;
      perform a pattern of read operations to the storage segments;
      determine a first performance metric indicative of a degradation of performance of an application executing on a first virtual machine of the plurality of virtual machines, the first performance metric being determined based on performing the pattern of read operations, the degradation being attributable to a computing process executing on a second virtual machine of the plurality of virtual machines; and
      provide the first performance metric as an input to a machine learning model that is configured to output a second performance metric indicative of the performance of the application absent the degradation attributable to the computing process.

2. The system of claim 1, wherein the storage segments comprise at least one of:
   cache lines of a cache associated with the at least one processor circuit on which the plurality of virtual machines executes;
   storage sectors of a hard disk drive shared by the plurality of virtual machines; or
   storage sectors of a solid state drive shared by the plurality of virtual machines.

3. The system of claim 2, wherein the performance degradation detector is further configured to:
   read a central processing unit identification (CPUID) register of the at least one processor circuit that specifies a configuration of the cache, the cache configuration comprising at least one of:
   a size of the cache;
   a set associativity scheme utilized by the cache; or
   a number of lines in each set of the cache.

4. The system of claim 3, wherein the cache is shared by the plurality of processing cores.

5. The system of claim 1, wherein the performance degradation detector is further configured to:
   determine a particular number of storage segments of the physical data storage;
   determine a number that is co-prime with the particular number of storage segments;
   set a multiplier value to a predetermined value; and
   for each iteration of a plurality of predetermined iterations:
      multiply the co-prime number by the multiplier value to generate a first value;
      determine a remainder value by dividing the first value by the particular number of storage segments;
      write a data value to a storage segment of the storage segments corresponding to the remainder value; and
      increment the multiplier value.

6. The system of claim 5, wherein the data value is equal to the first value.

7. The system of claim 1, wherein the performance degradation detector is further configured to:
   perform a first read operation to read the data from the storage segments;

determine a first length of time for the data to be retrieved from the storage segments;

perform a second read operation to read the data from the storage segments; and determine a second length of time for the data to be retrieved from the storage segments.

8. The system of claim 7, wherein the performance degradation detector is further configured to:

determine that a difference between the second length of time and the first length of time exceeds a predetermined threshold; and responsive to a determination that the difference exceeds the predetermined threshold, determine that the degradation of performance of the application is attributable to the computing process, the first performance metric being equal to the difference.

9. A method, comprising:

determining a configuration of a physical data storage shared between a plurality of virtual machines;

populating storage segments of the physical data storage with data in accordance with the determined configuration;

performing a pattern of read operations to the storage segments;

determining a first performance metric indicative of a degradation of performance of an application executing on a first virtual machine of the plurality of virtual machines, the first performance metric being determined based on performing the pattern of read operations, the degradation being attributable to a computing process executing on a second virtual machine of the plurality of virtual machines; and providing the first performance metric as an input to a machine learning model that is configured to output a second performance metric indicative of the performance of the application absent the degradation attributable to the computing process.

10. The method of claim 9, wherein the storage segments comprise at least one of:

cache lines of a cache associated with a processor circuit on which the plurality of virtual machines executes;

storage sectors of a hard disk drive shared by the plurality of virtual machines; or storage sectors of a solid state drive shared by the plurality of virtual machines.

11. The method of claim 10, wherein said determining the configuration of the physical data storage comprises:

reading a central processing unit identification (CPUID) register that specifies a configuration of the cache, the cache configuration comprising at least one of:

a size of the cache;

a set associativity scheme utilized by the cache; or a number of lines in each set of the cache.

12. The method of claim 9, wherein said populating the storage segments comprises:

determining a particular number of storage segments of the physical data storage;

determining a number that is co-prime with the particular number of storage segments;

setting a multiplier value to a predetermined value; and for each iteration of a plurality of predetermined iterations:

multiplying the co-prime number by the multiplier value to generate a first value;

determining a remainder value by dividing the first value by the particular number of storage segments;

writing a data value to a storage segment of the storage segments corresponding to the remainder value; and incrementing the multiplier value.

13. The method of claim 12, wherein the data value is equal to the first value.

14. The method of claim 9, wherein said performing the pattern of read operations to the physical data storage segments comprises:

performing a first read operation to read the data from the storage segments;

determining a first length of time for the data to be retrieved from the storage segments;

performing a second read operation to read the data from the storage segments; and determining a second length of time for the data to be retrieved from the storage segments.

15. The method of claim 14, wherein said determining the first performance metric comprises:

determining that a difference between the second length of time and the first length of time exceeds a predetermined threshold; and responsive to determining that the difference exceeds the predetermined threshold, determining that the degradation of performance of the application is attributable to the computing process, the first performance metric being equal to the difference.

16. A computer-readable storage medium having program instructions recorded thereon that, when executed by at least one processor, perform a method, the method comprising:

determining a configuration of a physical data storage shared between a plurality of virtual machines;

populating storage segments of the physical data storage with data in accordance with the determined configuration;

performing a pattern of read operations to the storage segments;

determining a first performance metric indicative of a degradation of performance of an application executing on a first virtual machine of the plurality of virtual machines, the first performance metric being determined based on performing the pattern of read operations, the degradation being attributable to a computing process executing on a second virtual machine of the plurality of virtual machines; and providing the first performance metric as an input to a machine learning model that is configured to output a second performance metric indicative of the performance of the application absent the degradation attributable to the computing process.

17. The computer-readable storage medium of claim 16, wherein the storage segments comprise at least one of:

cache lines of a cache associated with the processor on which the plurality of virtual machines executes;

storage sectors of a hard disk drive shared by the plurality of virtual machines; or storage sectors of a solid state drive shared by the plurality of virtual machines.

18. The computer-readable storage medium of claim 17, wherein said determining the configuration of the physical data storage comprises:

reading a central processing unit identification (CPUID) register that specifies a configuration of the cache, the cache configuration comprising at least one of:

a size of the cache;

a set associativity scheme utilized by the cache; or a number of lines in each set of the cache.

19. The computer-readable storage medium of claim 16, wherein said populating the storage segments comprises:
- determining a particular number of storage segments of the physical data storage;
- determining a number that is co-prime with the particular number of storage segments;
- setting a multiplier value to a predetermined value; and
- for each iteration of a plurality of predetermined iterations:
  - multiplying the co-prime number by the multiplier value to generate a first value;
  - determining a remainder value by dividing the first value by the particular number of storage segments;
  - writing a data value to a storage segment of the storage segments corresponding to the remainder value; and
  - incrementing the multiplier value.

20. The computer-readable storage medium of claim 19, wherein the data value is equal to the first value.

* * * * *